L. C. WEYAND.
SEAL LOCK.
APPLICATION FILED FEB. 17, 1910.
1,115,756.
Patented Nov. 3, 1914.
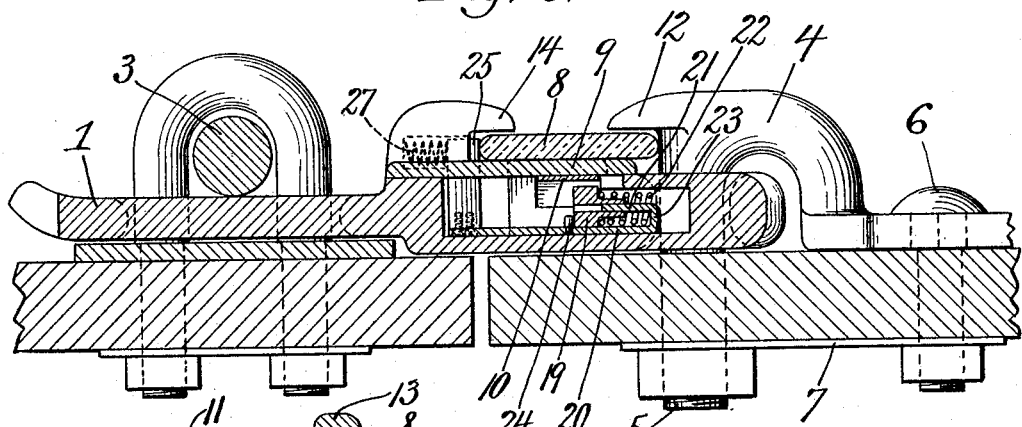
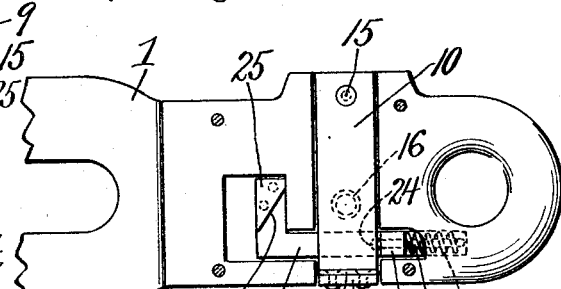
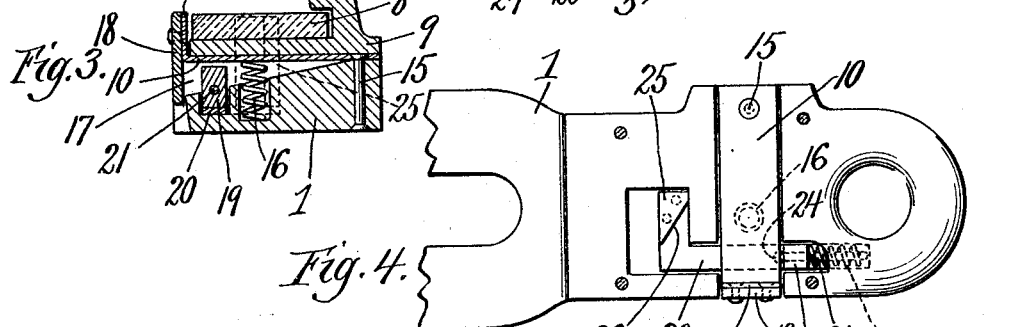
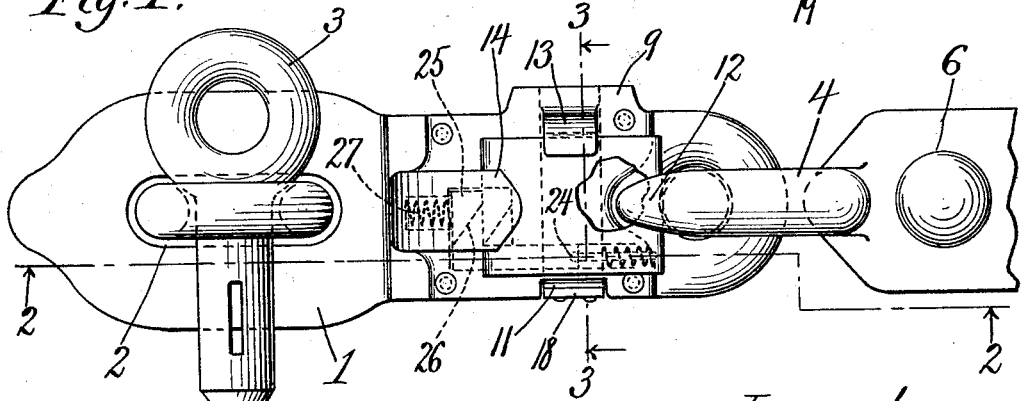
Witnesses.
Edward T. Wray.
Edna K. Reynolds.
Inventor.
Lawrence C. Weyand
by Parker & Carter
Attorneys.

UNITED STATES PATENT OFFICE.

LAWRENCE C. WEYAND, OF CHICAGO, ILLINOIS, ASSIGNOR TO BATTENBERG CAR SEAL AND EQUIPMENT CO., A CORPORATION OF ILLINOIS.

SEAL-LOCK.

1,115,756.  Specification of Letters Patent.  Patented Nov. 3, 1914.

Application filed February 17, 1910. Serial No. 544,456.

*To all whom it may concern:*

Be it known that I, LAWRENCE C. WEYAND, a citizen of the United States, residing at Chicago, in the county of Cook and State of Illinois, have invented a certain new and useful Improvement in Seal-Locks, of which the following is a specification.

This invention relates to seal locks, and has for its object to provide a new and improved device of this description.

The invention is illustrated in the accompanying drawings, wherein—

Figure 1 is a view showing a hasp lock embodying the invention; Fig. 2 is a sectional view taken on line 2—2 of Fig. 1; Fig. 3 is a sectional view taken on line 3—3 of Fig. 1; Fig. 4 is a view similar to Fig. 1, with portions removed.

Like numerals refer to like parts throughout the several figures.

This invention is particularly adapted for hasp locks where frangible seals are used, and can be applied to any door or other device where hasps are used, and is particularly adapted to be used on railway cars and the like.

Referring now to the drawings, I have shown a hasp 1 provided with an opening adapted to fit over a staple 2, or other fastening part, and there may be provided the usual fastening pin 3. The hasp at the other end is connected with the fastening part 4, which is fastened to a stationary part at the side of the door or other movable part which the hasp locks. This fastening part may be fastened in position in any desired manner, as by means of the bolt 5 and the bolt 6, these two being preferably connected together by a connecting piece 7. The hasp is provided with suitable means for connecting therewith a seal 8 of frangible material. As herein shown the seal is supported upon a plate 9, which covers suitable parts for preventing the removal of the seal. Beneath the plate 9 is a locking part 10, which is provided with a stop piece 11 (see Fig. 3). The locking part 10 is arranged so that the stop piece 11 may be moved down, for example, so that its top will be at least substantially flush with the plate 9 so that the seal may be easily slid in beneath the holding parts 12, 13 and 14. Any suitable arrangement for this purpose may be used. As herein shown the locking plate 10 is made of spring material, and is held in place by a rivet 15. A spring 16 is located under the locking plate and tends normally to push it up to the position shown in Fig. 3. The stop piece 11 should be strong enough so that it can not be bent down to permit the removal of the seal, and there should also be a piece which protects or covers the space 17 beneath it, and which prevents access to the space. Any suitable arrangement for this purpose may be used. As herein shown the stop piece is strengthened and the space 17 protected by means of a strengthening piece 18 fastened to the stop piece 11. Associated with the locking plate 10 is a stop 19 removably mounted upon a slide 20. This slide 20 has an arm 21 which enters a hole in the stop 19 so that the stop may be slid back and forth along said arm. A spring 22 surrounds said arm and is located between the stop and the end of the arm engaging the stop and an engaging part 23 at the end of the arm. A pin 24 limits the movement of the stop in response to the spring 22. The slide 20 has an upwardly projecting part 25 which passes through an enlarged opening in the plate 9, and which is provided with a beveled engaging part 26 in the path of the seal. A spring 27 normally tends to hold said beveled engaging part in the path of the seal. The part 12 which projects out over the seal is fastened to the stationary fastening part 4 with which the hasp is movably connected, and the plate 9 beneath the part 12 is cut away so that when the hasp is moved to remove it from the staple 2 or other fastening part the frangible seal will be broken by the part 12.

The use and operation of my invention are as follows: When it is desired to place the frangible seal 8 in position, the stop piece 11 is pushed downwardly until its top is flush with the plate 9 carrying with it the locking part 10. The stop 19 is out from under the locking part at this time, because there is no seal in position, and the spring 27 pushes the slide 20 toward the part 4 so that the stop will be out of the way. When the locking part 10 is down, it engages the stop 19 and prevents its movement in response to the spring 22. When the seal is pushed in, from below it engages the beveled engaging part 26 and moves it against the pressure of the spring 27, causing the slide 20 to also move and compress the spring 22. The stop 19 is held against movement by the locking part 10, as under these conditions the locking part is pressed down in front of it so as to obstruct its movement. When the seal has been pushed into position under the parts 12, 13 and 14, its edge passes the stop piece 11 so as to free it, and the stop piece in response to spring 16 moves upwardly to the position shown in Fig. 3. The part 10 then releases the stop 19 which, under the pressure of the spring 22, moves forward under the part 10 until it strikes the pin 24. The stop piece 11 cannot now be moved down, and the seal is locked in position and it cannot be removed except by breaking it. It will be noted that the hasp cannot be moved so as to permit the door or other part with which it is associated to be opened without breaking the seal, and hence making it apparent that it has been tampered with.

I claim:

1. The combination with a hasp of a seal receiving space associated therewith, and locking mechanism for locking the seal in said receiving space, said locking mechanism actuated by the seal as it is moved into said receiving space and having a locking part at the entrance of said seal receiving space.

2. The combination with a hasp of a seal receiving space associated therewith, locking mechanism for locking the seal in place, a fastening part for the hasp by means of which it is fastened in position and on which it swings as it is moved to and from its locking position, and a stationary seal breaking part connected with said fastening part.

3. A hasp provided with a seal receiving space, a movable stop piece for preventing the removal of said seal, said stop piece being in an inoperative position while the seal is being moved into said seal receiving space, and means actuated by the movement of the seal for automatically moving said stop piece to its operative position.

4. A hasp provided with a seal receiving space, a movable stop piece located at the entrance of said seal receiving space for preventing the removal of said seal, and means for preventing the insertion of the seal in the receiving space until the hasp is moved to its locking position.

5. A seal lock comprising a part having a seal receiving space, a movable stop piece at the entrance of said seal receiving space for preventing the removal of the seal, an automatic locking device for locking said seal in place, said automatic locking device controlled by said seal.

6. A hasp provided with a seal receiving space for receiving a frangible seal, a locking device for locking said seal in position, a hasp holding part which holds the free end of the hasp in its operative position, and a stationary device for engaging the seal while the hasp is being moved out of engagement with said hasp holding part so as to cause said seal to be broken during said movement.

7. A hasp provided with a seal receiving space for receiving a frangible seal, means for holding said seal in position, said means protected by the seal so that it cannot be operated while the seal is in place, a fastening part upon which said hasp is carried, and a stationary seal mutilating part connected with said fastening part.

8. A seal lock device comprising a hasp carrying a frangible seal, and stationary means combined with said hasp for mutilating said seal and brought into operation by the movement of the hasp from its locking to its unlocking position.

9. A seal lock device comprising a part provided with a seal receiving space, a movable stop piece for preventing the removal of said seal, a reciprocating stop for said movable stop piece to prevent its being moved to release the seal, and means actuated by the seal while being moved in place for moving said stop to its operative position.

10. A seal lock device comprising a part provided with a seal receiving space, a movable stop piece for preventing the removal of said seal, a controlling part for said stop separated therefrom and in the path of the seal and adapted to be engaged thereby.

11. A seal lock device comprising a part provided with a seal receiving space, a movable stop piece for preventing the removal of said seal, said stop piece being out of the path of the seal while it is being moved into said receiving space and means for moving said stop into the path of the seal after said seal has been moved into said receiving space so as to prevent its removal.

12. A seal lock device comprising a hasp having a seal receiving space, a stop piece adapted to be brought into operative relation with the seal when it is in the seal receiving space so as to prevent its withdrawal, a fastening part with which said hasp is movably connected, a projecting holding part on said fastening part projecting beyond the boundary of the seal and adapted when the hasp is in its operative position to help hold the seal against removal, said projecting holding part on said fastening part adapted to engage the seal and mutilate it when the hasp is moved.

LAWRENCE C. WEYAND.

Witnesses:
EDNA K. REYNOLDS,
MINNIE M. LINDERAN.

---

Copies of this patent may be obtained for five cents each, by addressing the "Commissioner of Patents, Washington, D. C."